(12) United States Patent
Jokada et al.

(10) Patent No.: US 11,730,575 B2
(45) Date of Patent: Aug. 22, 2023

(54) MILLING BURS AND SYSTEMS AND METHODS FOR PERFORMING QUALITY CONTROL OF THE SAME

(71) Applicant: James R. Glidewell Dental Ceramics, Inc., Newport Beach, CA (US)

(72) Inventors: Marco A. Jokada, Diamond Bar, CA (US); Vaheh Golestanian Nemagrdi, Orange, CA (US); Kenad Destanovic, Mission Viejo, CA (US); Marshall L. Fernald, Westminster, CA (US); David C. Leeson, Laguna Beach, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

(21) Appl. No.: 17/017,069

(22) Filed: Sep. 10, 2020

(65) Prior Publication Data
US 2022/0071745 A1   Mar. 10, 2022

(51) Int. Cl.
*A61C 13/00*   (2006.01)

(52) U.S. Cl.
CPC ...... *A61C 13/0006* (2013.01); *A61C 13/0022* (2013.01)

(58) Field of Classification Search
CPC .......... G01N 3/58; A61C 3/02; A61C 13/0022
See application file for complete search history.

(56) References Cited

U.S. PATENT DOCUMENTS

| | | | | |
|---|---|---|---|---|
| 3,841,149 A | * | 10/1974 | Edwin | G05B 19/4065 73/104 |
| 3,895,446 A | * | 7/1975 | Orlov | G01B 7/287 33/533 |
| 3,987,670 A | * | 10/1976 | Tuzzeo | G01N 3/58 73/104 |
| 4,120,196 A | * | 10/1978 | Hamilton | G01N 3/58 73/104 |
| 4,228,514 A | * | 10/1980 | Weiss | G05B 19/4065 73/104 |
| 4,351,029 A | * | 9/1982 | Maxey | G01N 3/58 73/104 |
| 4,442,494 A | * | 4/1984 | Fromson | G05B 19/4065 73/104 |
| 5,187,542 A | * | 2/1993 | Madzsar | G01N 21/71 356/311 |
| 5,266,929 A | * | 11/1993 | Carmichael | G05B 19/4065 73/104 |

(Continued)

FOREIGN PATENT DOCUMENTS

| | | | | |
|---|---|---|---|---|
| CN | 103192293 A | * | 7/2013 | |
| CN | 106142198 B | * | 4/2018 | B26D 1/0006 |

(Continued)

*Primary Examiner* — Jacob J Cigna
(74) *Attorney, Agent, or Firm* — Charles Fowler

(57) ABSTRACT

Disclosed are example embodiments of a milling bur specifically designed to mill a dental prosthesis from a full-sintered zirconia blank. The milling bur comprises a milling tip configured to have a factor of safety of at least 2 by having a first coverage-percentage of grinding particles covering a surface area of the tip of the milling bur. The factor of safety is a number of time the milling bur can fully mill a dental prosthesis from a fully-sintered zirconia blank.

18 Claims, 8 Drawing Sheets

(56) References Cited

U.S. PATENT DOCUMENTS

| | | | | |
|---|---|---|---|---|
| 5,587,925 | A * | 12/1996 | Li | G01M 99/00 |
| | | | | 702/43 |
| 6,764,306 | B1 * | 7/2004 | DiMarino | A61C 3/02 |
| | | | | 433/165 |
| 8,151,659 | B2 * | 4/2012 | Diemer | B23Q 3/155 |
| | | | | 73/865.9 |
| 8,337,204 | B2 * | 12/2012 | Lowder | A61C 3/06 |
| | | | | 433/166 |
| 8,870,571 | B2 * | 10/2014 | Lowder | A61C 3/06 |
| | | | | 433/166 |
| 9,615,895 | B2 * | 4/2017 | Yumiyama | A61C 3/06 |
| 11,210,788 | B2 * | 12/2021 | Ajri | G06F 17/18 |
| 2006/0112648 | A1 * | 6/2006 | Hanyu | C23C 30/00 |
| | | | | 51/295 |
| 2006/0286506 | A1 * | 12/2006 | Birnholtz | A61C 3/02 |
| | | | | 433/165 |
| 2015/0028007 | A1 * | 1/2015 | Pluss | B23K 26/40 |
| | | | | 219/121.68 |
| 2015/0149027 | A1 * | 5/2015 | Paulsen | G01N 3/56 |
| | | | | 701/29.4 |
| 2016/0097702 | A1 * | 4/2016 | Zhao | E21B 10/56 |
| | | | | 73/799 |
| 2020/0300758 | A1 * | 9/2020 | Teshima | G05B 19/4065 |
| 2022/0125552 | A1 * | 4/2022 | Zollinger | C25F 3/24 |

FOREIGN PATENT DOCUMENTS

| | | | | |
|---|---|---|---|---|
| WO | WO-2006034281 A1 * | 3/2006 | | A61C 1/00 |
| WO | WO-2016169782 A1 * | 10/2016 | | B23Q 17/0919 |
| WO | WO-2018114066 A1 * | 6/2018 | | B23B 3/00 |
| WO | WO-2018174139 A1 * | 9/2018 | | B23B 27/148 |
| WO | WO-2021020484 A1 * | 2/2021 | | |
| WO | WO-2021038438 A1 * | 3/2021 | | A61C 3/02 |

* cited by examiner

MILLING BURS AND SYSTEMS AND METHODS FOR PERFORMING QUALITY CONTROL OF THE SAME

TECHNICAL FIELD

The disclosure relates generally to the field of milling bur, specifically and not by way of limitation, some embodiments are related to a specialized milling bur specifically designed for milling zirconia to fabricate dental prostheses.

BACKGROUND

Dental prostheses such as crowns are generally made in a dedicated manufacturing facility with complex and expensive milling machines. The milling process of a dental prosthesis starts with a partially or fully-sintered zirconia blank, which is milled according to the specification of a 3D model (e.g., STL—stereolithography). In certain cases, the milling process uses a fully-sintered zirconia blank to create the dental prosthesis. In this way, the dental prosthesis can be manufactured without an additional sintering step after the milling process is completed. However, fully-sintered zirconia is a very hard material and can often break the milling bur if the milling bur does not have certain features.

Typically, it takes approximately 45 minutes to mill a complete dental prosthesis from a fully-sintered zirconia blank. This can be a long and expensive process, particularly when the milling process fails before the dental prosthesis is fully milled. For example, if a milling bur fails when the dental prosthesis is 80% milled, the milling bur is lost and the partially completed dental prosthesis must be discarded. In this scenario, the milling process must be restarted from the beginning with a new milling bur and a zirconia blank, both of which can be very expensive to produce.

Today, milling burs are inspected destructively by cutting the tip of a bur to examine the cross-section of the tip. Since there is no existing guidance on the type of defects to examine and metrics for quantifying the defects, the current manual and destructive examination process only looks for certain visual indicators such as cracks, voids, and missing diamond particles that may predict the performance of the milling bur. The results of the destructive examination process is then extrapolated onto other milling burs that were produced in the same batch. A batch of milling burs can have 1000-5000 milling burs. Accordingly, in order to extrapolate the results of the destructive test, hundreds of milling burs must be destructively tested. However, this assumes that all milling burs in the same batch are the same. From experiences, this has not been the case. Milling burs can vary greatly within the same batch. Thus, the destructive examination process is at best a guestimate on the performances of the batch. Accordingly, what is needed is an improved milling bur design and a method to perform quality control of the same.

SUMMARY

Disclosed are methods for manufacturing a dental prosthesis using a specialized-milling bur. One of the methods includes: determining, using an inspection system, one or more attributes of a tip of the specialized milling bur; determining whether the one or more attributes meets a quality threshold based at least on the determined one or more attributes; and rejecting or passing the milling bur for use in a milling machine to fabricate the dental prosthesis based at least on whether the one or more attributes meets a quality threshold. The one or more attributes comprise a coverage-percentage of grinding particles covering a surface area of the tip.

The quality threshold can be a factor of safety derived from empirical data obtained by a measuring and testing process for assessing milling bur performance. The factor of safety is a number of time times the milling bur can fully mill a dental prosthesis from a fully-sintered zirconia blank. The measuring and testing process can be a destructive measurement process that measures at least one of the coverage-percentage of grinding particles covering the surface area of the tip and a mean height value of the grinding particles. The measuring and testing process can also be an image measurement process that measures at least one of a coverage-percentage of grinding particles covering a surface area of the tip and a mean height value of the grinding particles.

The factor of safety can be at least 2, which comprises a coverage-percentage of at least 25% of the surface area of the tip. For the same factor of safety of at least 2, the one or more attributes can also include a mean tip height of the grinding particles, which can be less than 30 microns. The factor of safety can be at least 3, which comprises a coverage-percentage of at least 40% of the surface area of the tip.

In some embodiments, rejecting or passing the milling bur can include: identifying a candidate dental prosthesis having machining parameters that best fit the factor of safety of the milling bur; and shipping the milling bur for use to mill the identified candidate dental prosthesis.

The method can further include discarding milling burs that do not meet the quality threshold using a milling bur-removal apparatus. The inspection system can be configured to measure a height of a diamond particle using focus variation.

Also disclosed are examples embodiments of a milling bur for milling a fully-sintered zirconia blank to create an on-demand dental prosthesis. The milling bur includes a milling tip configured to have a factor of safety of at least 2 by having a coverage-percentage of grinding particles covering a surface area of the tip of the milling bur. The factor of safety is a number of time the milling bur can fully mill a dental prosthesis from a fully-sintered zirconia blank.

For a factor of safety of at least 2, the coverage-percentage is at least 25%. Additionally, for a factor of safety of at least 2, the milling tip can have a mean height value of the grinding particles of less than 30 microns. For a factor of safety of at least 3, the coverage-percentage is at least 40% when the factor of safety is at least 3.

Also disclosed are examples embodiments of a milling system for milling a fully-sintered zirconia blank to create an on-demand dental prosthesis. The milling system includes: a milling machine configured to receive the fully-sintered zirconia blank and to intake a digital model of a dental prosthesis; a milling bur comprises a milling tip configured to have a factor of safety by having a coverage-percentage of grinding particles covering a surface area of the tip of the milling bur; and a memory having one or more instructions, which when executed by a processor cause the milling machine to mill the fully-sintered zirconia blank with the milling bur to fabricate the dental prosthesis based on the digital model of the dental prosthesis.

The milling system also includes: an inspection system configured to capture an image of the milling tip; and an image analyzer configured to determine the first coverage-percentage of grinding particles. For a factor of safety of at least 2, the coverage-percentage is at least 25%. Additionally, for a factor of safety of at least 2, the milling tip can have a mean height value of the grinding particles of less than 30 microns. For a factor of safety of at least 3, the coverage-percentage is at least 40% when the factor of safety is at least 3. The factor of safety is derived at least from a measuring and testing process designed to measure how many dental prosthesis the milling bur can successfully mill before failure.

The measuring and testing process can be a destructive measurement process and/or an image measurement process that measures at least one of the coverage-percentage of grinding particles covering the surface area of the tip and a mean height value of the grinding particles.

Also disclosed are example embodiments of a milling bur for milling a fully-sintered zirconia blank to create an on-demand dental prosthesis. The milling bur includes a milling tip configured to have a factor of safety of at least 2 by having a first coverage-percentage of grinding particles covering a surface area of the tip of the milling bur, wherein the factor of safety is a number of time the milling bur can fully mill a dental prosthesis from a fully-sintered zirconia blank. The first coverage-percentage can be least 25% when the factor of safety is at least 2. The factor of safety of at least 2 can further be defined by a mean height value of the grinding particles of less than 30 microns.

Also disclosed are example embodiments of a milling bur specifically designed for milling a fully-sintered zirconia blank to create an on-demand dental prosthesis. The milling bur includes a milling tip having specifically designed features to mill the fully-sintered zirconia blank to fabricate the dental prosthesis. The milling tip can include a surface coated with a first material and grinding particles, where the grinding particles cover at least 25% of the surface area of the tip. In some embodiments, the grinding particles must cover the surface of the milling tip by 33% or more. The grinding particles can have a mean height is less than 35 microns. In some embodiments, the mean height can have a range of 25-45 microns. The first material can be a metal such as nickel or a metal alloy. The grinding particles can be diamond particles.

Also disclosed are example embodiments of a milling system for fabricating an on-demand dental prosthesis from a fully-sintered zirconia blank. One of the milling systems includes: a milling machine configured to receive the fully-sintered zirconia blank and to intake a digital model of a dental prosthesis; a milling bur having a milling tip coated with a first material and diamond particles; a memory having one or more instructions, which when executed by a processor cause the milling machine to mill the fully-sintered zirconia blank with the milling bur to fabricate the dental prosthesis based on the digital model of the dental prosthesis. The tip of the milling bur includes diamond particles that cover at least 25% of the surface area of the tip. In some embodiments, tip of the milling bur is required to be covered by at least 33% in diamond particles. The mean height of the diamond particles is less than 35 microns.

The milling system also includes an inspection system, which includes an image analyzer. The inspection system is configured to capture an image of the milling tip. The image analyzer is configured to verify that the diamond particles cover at least a threshold percentage of the surface and the mean height of the diamond particles is less than 35 microns. The threshold percentage can be at least 25% or 33%. The image analyzer is also configured to measure the height of diamond particles using focus variation.

The milling system can also include a milling bur-removal apparatus and a controller, which is configured to control the bur-removal apparatus to discard a milling bur if it fails to have diamond particles covering at least 25% of the surface and/or the mean height of less than 35 microns. The bur-removal apparatus can be a mechanical gripper configured to remove the milling-bur from the top. The bur-removal apparatus can also be an ejection mechanism configured to remove the milling bur by ejecting the milling bur from the bottom of the holding fixture. The ejection mechanism can be independent of the holding fixture Also disclosed are example embodiments of methods for fabricating an on-demand dental prosthesis from a fully-sintered zirconia blank. One of the methods includes: analyzing, using an inspection system, a tip of the milling bur to determine a coverage-percentage of grinding particles covering a surface area of the tip and a mean tip-height value of the diamond particles; determining whether the milling bur meets a quality threshold designed to identify milling bur that can completely mill the dental prosthesis from a fully-sintered zirconia blank based on the determined coverage-percentage and the mean tip height value of the diamond particles; and providing the milling bur to be installed into a milling machine when the milling bur meets the quality threshold.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Figure 1A:
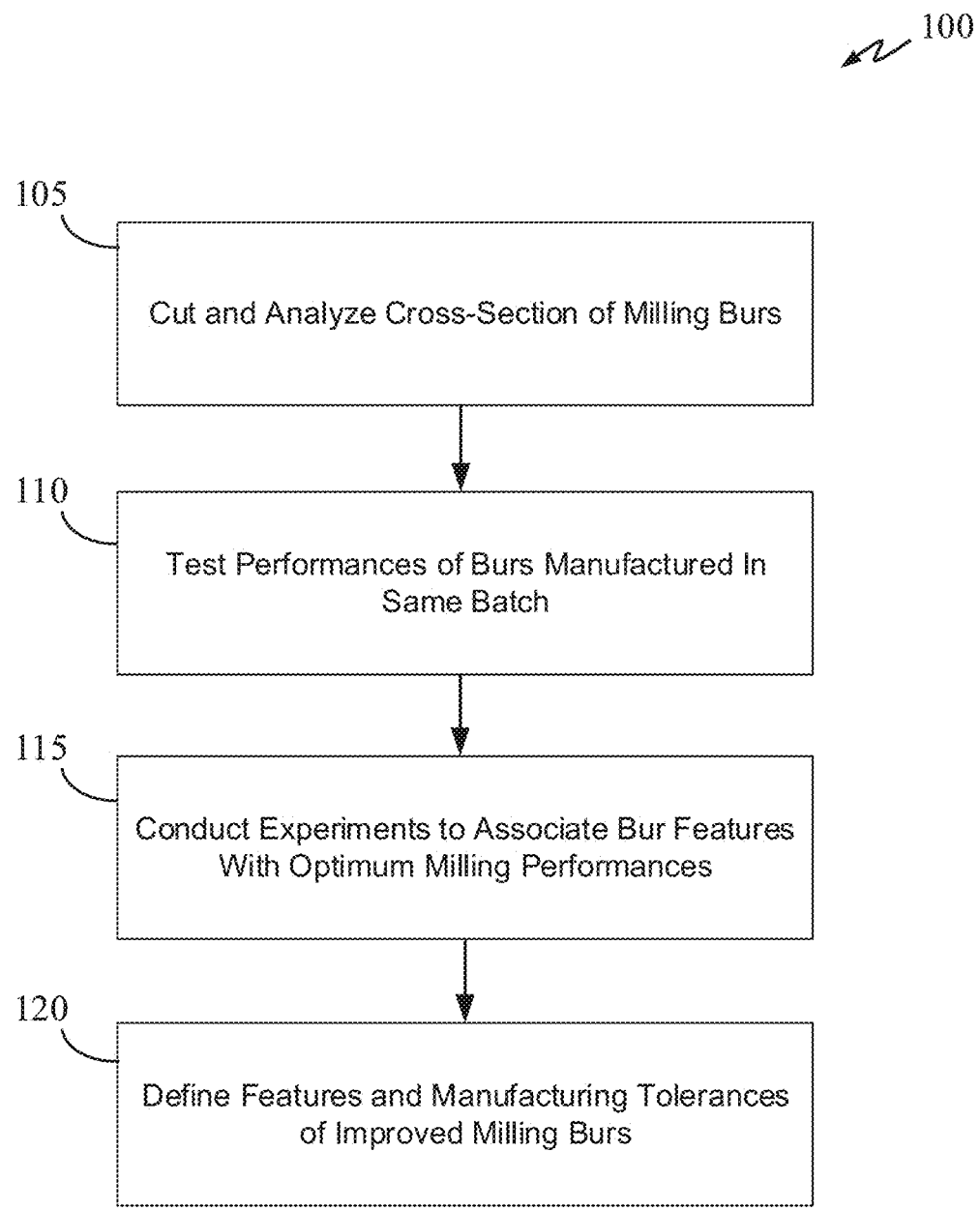
FIG. 1A is a flow diagram illustrating a design experimental process used to develop the milling bur in accordance with some embodiments of the present disclosure.
Figure 1B:
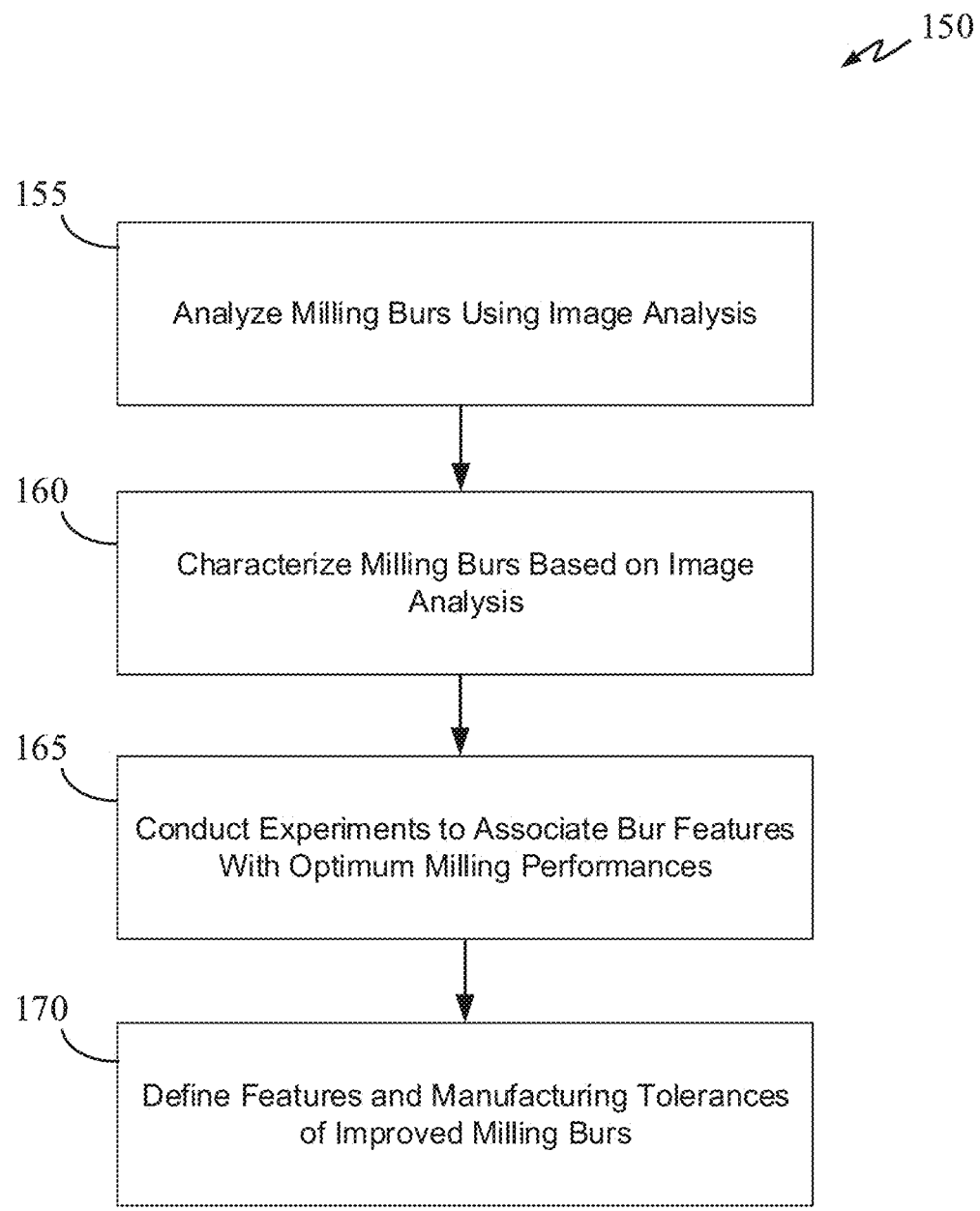
FIG. 1B is a flow diagram illustrating another design experimental process used to develop the milling bur in accordance with some embodiments of the present disclosure.

FIGS. 1A-B illustrate experimental design processes 100 and 150 used to determine and define features of a milling bur that would yield optimum milling performance (e.g., will not break, produce prosthesis within specified tolerances) in accordance with some embodiments of the present disclosure. Through trials-and-errors, process 100 and/or process 150 was used (through experimentations and inference based on probabilistic data) to identify and define essential characteristics that are critical to the performance of a milling bur. Using process 100 and/or 150, the essential bur-characteristics were identified, and metrics were developed to measure the same. From process 100 and/or 150, the essential characteristics (and their metrics) for the specialized milling bur were experimentally derived based on probabilistic data. When a milling bur exhibits the experimentally-derived characteristics and having metrics in a certain range, it has a very high chance of success. In other words, the milling bur has a very high chance that it can finish a full milling cycle (e.g., mill a dental prosthesis to completion) without breaking while also producing a high quality dental prosthesis.

Either process 100, 150, or both can be used to perform the design experiments. Both processes can complement each other and corroborate the findings. Each of processes 100 and 150 will be discussed in turn. Experimental design process 100 includes cutting milling burs at the tip so that the cross-section of the tip is exposed such that certain aspects of the tip can be observed and measured. At 105, burs from various batches are cut and analyzed. In some embodiments, for each bur, the diamond particles or grain coverage of the surface of the tip is measured and height of each diamond particle is also measured. For each batch, tens or hundreds of burs were cut, analyzed, and classified into various classification groups. For example, one classification group can include a mean tip height of the diamond particles at greater than 50 microns, and a grain coverage of 15%. A second classification group can include milling burs having a grain coverage of 20% and a mean tip height of greater than 40 microns. In another example, a third classification group can include milling burs having a grain coverage of 30% or 35% and a mean tip height of 35 microns or less. Although only three classification groups are described above, many more classification groups were used in processes 100 and 150.

A mean tip height is the average height of diamond particles extending from the base to the tip of the milling bur. The base of the milling bur starts at the top surface of the metal plating (e.g., nickel plating). In other words, the base is at the intersection between the top of the metal plating surface and the trunk of the grinding particle. Grain coverage is the percentage coverage of diamond particles covering the surface area of the tip. The surface of the tip is an area defined by the outer most edges of grinding particles such that a maximum surface area is traced. Additionally, the surface area of the tip can include an area extending 0-10 microns from the perimeter traced by the farthest edges of the grinding particles.

Figure 2:
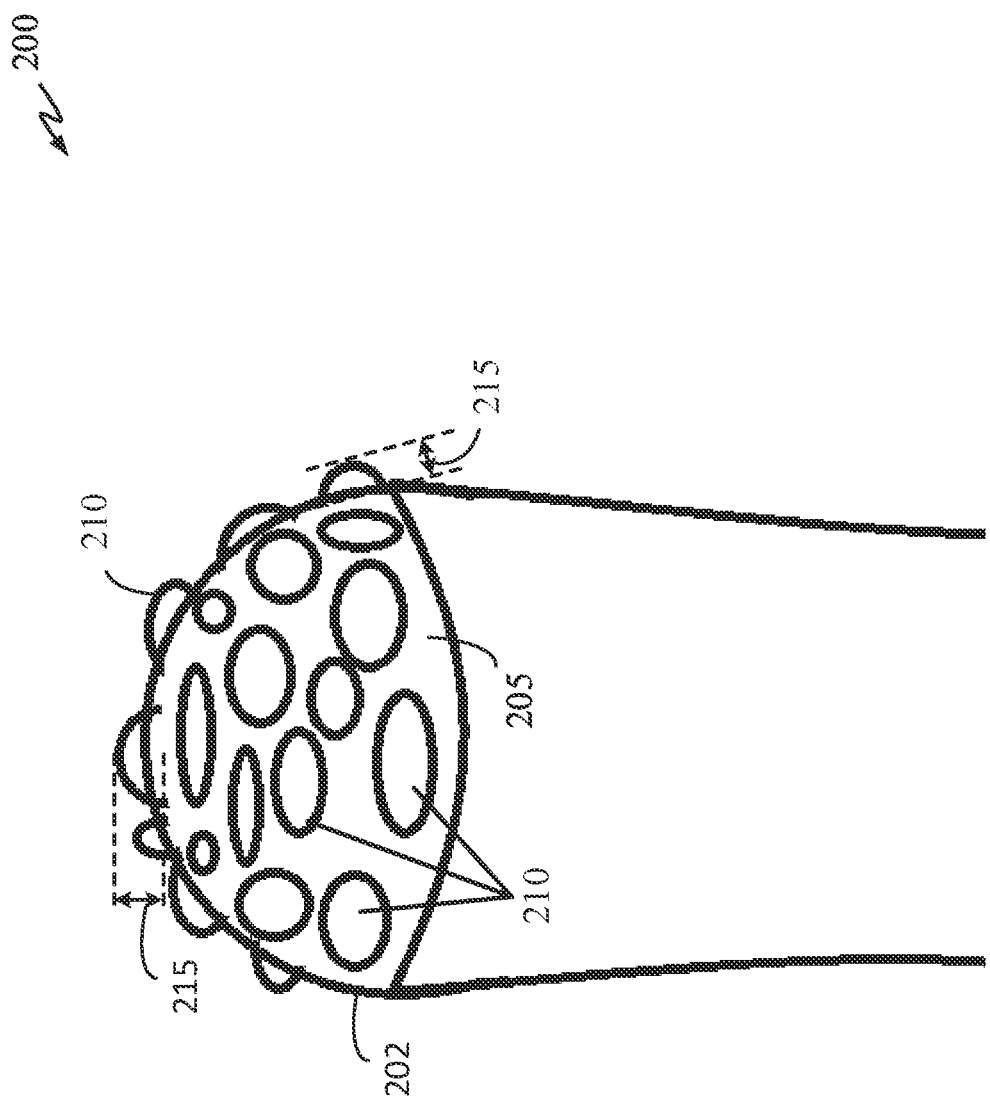
FIG. 2 is a close-up view of the tip of a milling bur and metrics used to quantify milling burs in accordance with some embodiments of the present disclosure.

Referring now to FIG. 2, which is a close-up view illustration of a milling bur, milling bur 200 includes tip region 202 that is coated with a first material 205 and a plurality of grinding particles 210. First material 205 can be a metal or metal alloy such as, but not limited to, nickel. Grinding particles 210 can be a hard substance such as, but not limited to, diamond particles. In sub-process 110, the height of each diamond particles were measured. The height is measured from the base to the tip of the diamond particle. After the heights of the diamond particles are measured, a mean tip or height value can be calculated. In some embodiments, sub-process 110 also measures the number of diamond particles (e.g., grains) and the percentage of the surface area of the tip region is covered with the diamond particles. In some embodiments, the thickness of the metal (e.g., nickel) plating can also be measured. Each of the above features are measured and stored along with the lot/batch number and other relevant information relating (e.g., coating process, plating oven ID, operator) to the manufacturing process of the milling burs.

Referring back to FIG. 1A, in experimental design process 100, many small batches of milling burs were produced to increase the likelihood that milling burs within the same batch exhibit the same features. Since various features of each milling bur were measured using a destructive test, only untested milling burs from the same batch can be used to conduct further experiments. Again, untested milling burs from the same (small and controlled) batch are assumed to exhibit the same features (e.g., grain coverage, mean tip height) as the milling burs that were destructively tested.

At 115, untested milling burs of each batch are used to mill fully-sintered zirconia blanks. Various metrics can be recorded during sub-process 115 such as, for example: whether the milling process was completed without any breakage of the milling bur; time it takes to completely mill a dental prosthesis; and the quality of the dental prosthesis (e.g., tolerance, smoothness, visible defects). In this step, the settings of the milling machine are the same across each batch. For example, the milling RPM (rotation per minute) is kept the same for each batch, and the same milling machine(s) can be used. The same 3D model of the dental prosthesis was also used. Additionally, the same batch of fully-sintered zirconia blanks were used or batches of zirconia blanks having substantially the same quality metrics. In this way, any variations in the results can be minimized and variations are likely attributed to certain aspects/features of the milling burs and not from the milling process.

At sub-process 120, metrics taken during and/or after the milling process are analyzed together with the metrics measured at sub-process 110 to generate relationship(s) between performance and milling bur characteristics. The observed relationships between metrics taken during (and/or after) the milling process and the measured characteristics of the milling burs at sub-process 110 are then used to define which of the measured characteristics are important to the performance of the milling burs.

Figure 3:
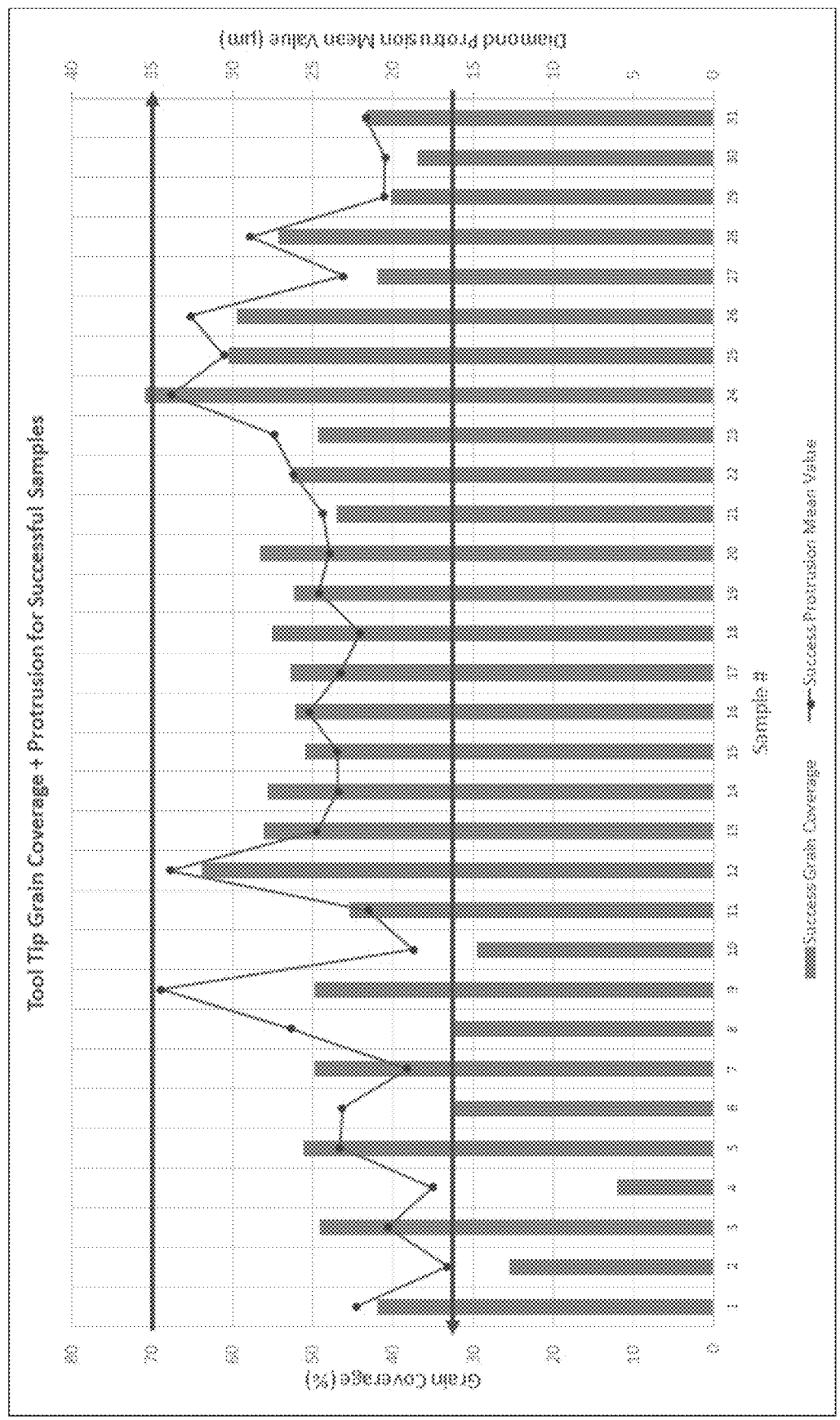
FIG. 3 is a graph illustrating results of a design experimental process in accordance with some embodiments of the present disclosure.

FIG. 3 is a chart 300 illustrating results obtained by process 100 and/or 150. Chart 300 shows the general range of percent grain coverage and mean height value for milling burs that produced successful samples. As shown, the bulk of the successful burs have a percentage grain coverage falling between 35-60%. Similarly, for the mean height value, the bulk of the successful burs have a mean height between 35-50 microns. Based at least on chart 300, it can be concluded that probabilistically that milling burs having a percent grain coverage range between 35-60% are likely to successfully mill a dental prosthesis from a fully sintered zirconia blank. Similarly, the probabilistic data suggest that milling burs with a mean height between 35-50 microns will likely produce successful milling samples. Tables 1A and 1B below corroborate this finding.

TABLE 1A

| Tool # | % Grain Coverage | Mean Height | Factor of Safety | Average % Grain Coverage | Average Mean Height |
|---|---|---|---|---|---|
| 38 | 8.75% | 7.35 | 1 | | |
| 39 | 13.01% | 12.58 | 1 | 23.4% | 16.7 microns |
| 40 | 13.09% | 9.48 | 1 | | |
| 3 | 17.25% | 15 | 1 | | |
| 50 | 19.76% | 15.21 | 1 | | |
| 6 | 21.24% | 17 | 1 | | |
| 8 | 22.59% | 15 | 1 | | |
| 12 | 23.68% | 17 | 1 | | |
| 35 | 24.08% | 20 | 1 | | |
| 37 | 55.83% | 28.59 | 1 | | |
| 19 | 58.76% | 38 | 1 | | |
| 2 | 15.48% | 13 | 2 | | |
| 42 | 15.70% | 13.19 | 2 | 40.2% | 20.9 microns |
| 46 | 18.28% | 14.29 | 2 | | |
| 4 | 18.91% | 16 | 2 | | |
| 48 | 19.54% | 10.78 | 2 | | |
| 49 | 19.74% | 19.13 | 2 | | |
| 51 | 19.80% | 14.72 | 2 | | |
| 52 | 20.71% | 14.96 | 2 | | |
| 7 | 22.33% | 12 | 2 | | |
| 9 | 22.70% | 15 | 2 | | |
| 10 | 22.81% | 15 | 2 | | |
| 36 | 24.56% | 16 | 2 | | |
| 13 | 25.08% | 13 | 2 | | |
| 14 | 56.50% | 27 | 2 | | |
| 53 | 57.06% | 23.63 | 2 | | |
| 16 | 57.54% | 27 | 2 | | |
| 20 | 59.41% | 28 | 2 | | |
| 21 | 59.63% | 28 | 2 | | |
| 54 | 60.40% | 34.38 | 2 | | |
| 55 | 61.12% | 27.65 | 2 | | |
| 25 | 64.03% | 28 | 2 | | |
| 56 | 64.19% | 24.74 | 2 | | |
| 33 | 66.13% | 28.08 | 2 | | |
| 58 | 68.65% | 30.11 | 2 | | |
| 63 | 70.50% | 25.9 | 2 | | |

TABLE 1B

| Tool # | % Grain Coverage | Mean Height | Factor of Safety | Average % Grain Coverage | Average Mean Height |
|---|---|---|---|---|---|
| 1 | 13.51% | 13 | 3 | | |
| 5 | 16.48% | 17.56 | 3 | 55.3% | 28.6 microns |
| 18 | 19.72% | 16 | 3 | | |
| 22 | 23.61% | 28 | 3 | | |
| 23 | 57.98% | 31.67 | 3 | | |
| 24 | 58.34% | 30 | 3 | | |
| 26 | 60.69% | 29 | 3 | | |
| 27 | 61.11% | 32 | 3 | | |
| 31 | 61.64% | 23.3 | 3 | | |
| 32 | 62.64% | 29.2 | 3 | | |
| 34 | 62.82% | 31.93 | 3 | | |
| 44 | 63.85% | 35 | 3 | | |
| 57 | 63.93% | 31.7 | 3 | | |
| 59 | 64.39% | 29 | 3 | | |
| 60 | 64.77% | 37.09 | 3 | | |
| 64 | 64.89% | 30.55 | 3 | | |
| 65 | 66.64% | 25.62 | 3 | | |
| 66 | 66.66% | 28.87 | 3 | | |
| 67 | 69.01% | 33 | 3 | | |
| 11 | 14.22% | 18.71 | 4 | | |
| 15 | 15.78% | 24.57 | 4 | 44.9% | 25.2 microns |
| 28 | 17.38% | 15.03 | 4 | | |

TABLE 1B-continued

| Tool # | % Grain Coverage | Mean Height | Factor of Safety | Average % Grain Coverage | Average Mean Height |
|---|---|---|---|---|---|
| 29 | 19.19% | 15.99 | 4 | | |
| 30 | 23.62% | 16 | 4 | | |
| 41 | 57.17% | 28 | 4 | | |
| 43 | 58.12% | 27.02 | 4 | | |
| 45 | 59.67% | 34.07 | 4 | | |
| 47 | 60.57% | 29.74 | 4 | | |
| 61 | 67.78% | 30.85 | 4 | | |
| 62 | 69.20% | 31.11 | 4 | | |
| 68 | 69.98% | 37.09 | 4 | | |

Tables 1A and 1B show the relationship between i) the factor of safety, and ii) the average percent grain coverage and the average mean height value. Table 1B is a continuation of Table 1A. The factor of safety indicates how many dental prosthesis a milling bur can mill before failing. For example, a factor of safety of 2 means the milling bur can mill 2 dental prosthesis to completion before failing on the third prosthesis. A factor safety of 4 means the milling bur can successfully mill 4 complete dental prosthesis before failing on the fifth prosthesis. The goal of the experiment for Tables 1A and 1B is to identify and quantify which attributes of milling burs would yield a high factor of safety. For the experiment performed in Tables 1A and 1B, milling burs are used to mill one dental prosthesis after another until failure.

As shown in Tables 1A and 1B, milling burs with a factor of safety of 1 only has an average percent grain coverage of 23.4%. At a factor of safety of 2, the average percent grain coverage is almost twice as high at 40.2%. Similarly, for a factor of safety of 3 and 4, the average percent grain coverage are 55.3% and 44.9%, respectively, which are much higher than the average percent grain coverage at the factor of safety of 1. Based on this data, it can be probabilistically concluded that milling burs with a percent grain coverage of at least 25% will likely succeed milling at least 1 dental prosthesis. Further, the probabilistic data of Tables 1A and 1B indicate that milling burs having a percent coverage ranging between 25-55% have a high chance of successfully milling a dental prosthesis in the field (e.g., high factor of safety).

Accordingly, in some embodiments, the specialized milling bur can have a grain coverage of at least 25% but less than 60%. In some embodiments, the specialized milling bur can have a grain coverage between 33% and 55%. In other words, in one specific embodiment, the specialized milling bur can have a grain coverage of at least 33% but not more than 55%. It should be noted that the average percentage grain coverage is derived for each factor of safety value by eliminating the lowest and highest data points in each group.

Additionally, probabilistic data from Tables 1A and 1B show that a mean height value between 20-25 appears to yield a higher factor of safety. However, anecdotal evidence based at least on numerous hours of working with milling burs also suggests that a mean height value of less than 35 microns yield good results.

Referring now to FIG. 1B, which illustrates design experiment process 150 similar to process 100 described above, rather than destructively testing a plurality of milling burs in a batch in order to extrapolate the characteristics of untested milling burs of the entire batch, an inspection system is used. Process 150 utilizes a non-destructive process to measure the characteristic of each milling bur. In this way, all of the milling burs of a batch can be measured for the design experiment, and no extrapolation of untested burs is necessary. Process 150 starts at process 155 where each milling burs to be experimented in sub-process 165 is inspected using a bur-inspection system such as, but not limited to, an 2D/3D image analyzer. The image analyzer is configured to automatically capture a close up picture of the tip of the milling bur and to detect the grinding particles (e.g., diamond particles) and the electroplated metal used to bind the grinding particles to the metal surface of the tip of the milling bur. The image analyzer is also configured to automatically measure the height (e.g., protrusion) of each of the grinding particles and to calculate the mean height value of the grinding particles. Sub-processes 165 and 170 are similar to sub-processes 115 and 120 of FIG. 1A.

In some embodiments, sub-processes 155 and 160 can also be used in the quality control process of milling burs before they can be shipped out to customers. In some embodiments, some or all shipped milling burs can be visually inspected by an automatically quality control system that employs sub-processes 155 and 160. The QC system can be configured to reject or pass milling burs based on the measured grain coverage and/or the mean height value. In some embodiments, the QC system can reject milling burs based on grain coverage. The QC system can also reject milling burs based on mean height value. In another embodiments, the QC system can reject milling burs based on the measured grain coverage and the mean height value. The QC system can also reject milling burs based on the thickness of the plating metal layer, grain coverage, and/or mean height value. In some embodiments, the QC system is configured to reject milling burs having less than 30% grain coverage and a mean height less than 35 microns. Other substantially similar grain coverage and mean height value are considered and are within the scope of this disclosure. For example, a 25% or more grain coverage and or a mean height of less than 40 microns are within the scope of this disclosure.

Figure 4:
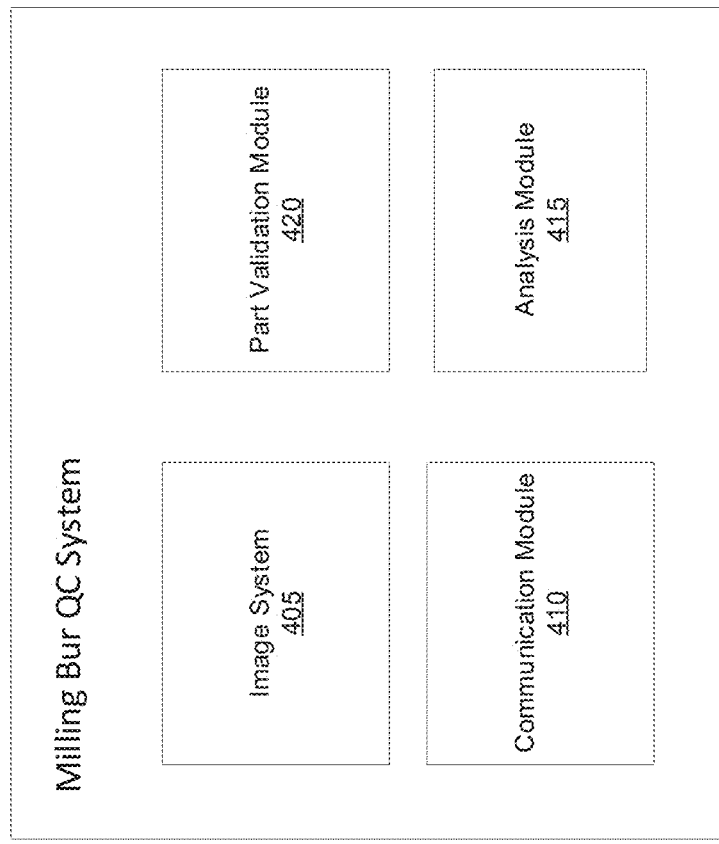
FIG. 4 is a block diagram illustrating a QC system in accordance with some embodiments of the present disclosure.

FIG. 4 illustrates a QC system 400 configured to perform quality control on one or more milling burs in accordance with some embodiments of the present disclosure. QC system 400 includes inspection system 405, communication module 410, analysis module 415, and part validation module 420. Inspection system 405 can include an inspection area and an imager. The inspection area is configured to receive a bur-holding fixture. The inspection area can be marked and/or include features to help align the holding fixture into place. For example, the inspection area can have guideposts and/or a recess area in which the holding fixture can drop. This helps the alignment procedure of the camera to be performed quickly and efficiently. In this way, the camera system can easily focus on the tip of the milling bur. Additionally, inspection system 405 can also use a laser-assisted alignment procedure where a laser is used as a guide to align the holding fixture into position such that the camera of inspection system 405 can easily focus on the tip of one milling burs. For example, in the laser-assisted alignment procedure, a laser can be directed at a spot on the inspection area. The spot can be the selected such that the camera can easily focus on the milling bur. To align the camera, the holding fixture is moved (e.g., translated in the x and/or y direction) until the tip of a designated (typically the upper-left most) milling bur is directly under (or completely covered) the laser. Once the laser is on the tip of the milling bur, the camera can be adjusted in the z-direction until a sharp focus attained. The alignment process can be done manually or by using step motors.

The imager of inspection system 405 can be a 2D and/or 3D imaging system that employs various imaging techniques such as, but not limited to, structured light, laser (e.g., confocal microscopy), radio, and ultra-high definition CMOS cameras.

Inspection system 405 can take an image of a milling bur and evaluate the image one a time before moving to another milling bur. The camera of inspection system 405 can be moved with respect the holding fixture. Alternatively, the holding fixture can be moved with respect to the camera. In some embodiments, inspection system 405 can include one or more cameras to enable multiple milling burs images to be taken simultaneously.

The holding fixture can include an RFID or other features (e.g., QR code, bar code) that contain identifying information such as the batch No. of the milling burs, manufacturing date, manufacturing facility, manufacturing line No., etc. Inspection system 405 can be configured to capture the bar code or the QR code and then upload the identifying information to a database (not shown) using communication module 410. In this way, the metrics generated (from the image(s) captured by inspection system 405) by analysis module 415 can be associated with the identifying information.

Analysis module 415 is configured to analyze one or more images of the tip of each milling bur to generate a percentage grain coverage and the mean height of the diamond protrusions. In some embodiments, analysis module 415 is configured to, using image analysis, identify grinding particles (e.g., diamond particles) and calculate the percent grain coverage based on at least the number of identified grinding particles. For example, analysis module 415 can calculate the total surface area of all the grinding particles combined.

Analysis module 415 is also configured to calculate the height of each grinding particle using various depth measuring methods such as, but not limited to, focus variation, confocal microscopy, and Fourier frequency domain analysis using a deep neural network. Focus variation employs small depth of focus of the imaging system to determine the depth based on the variation in focus and the focal length of the imaging system. In some embodiments, inspection system 405 is configured to use focus variation to measure the depth of an object. For example, inspection system 405 can use focus variation to measure the height of a plurality of grinding particles and then calculate the mean height value of the plurality of grinding particles.

In another instance, inspection system 405 can use a confocal microscopy system to measure the height of a plurality of grinding particles. Confocal microscopy is an optical imaging technique that uses point illumination to remove out-of-focus light. Confocal microscopy uses a laser to generate high intensities reflectance from the focal spot. This enables confocal microscopy system to have many advantages such as enabling reconstruction of 3-D images and having high optical resolution and contrast.

In some embodiments, Fourier frequency domain analysis can be implemented using a trained deep learning neural network to estimate the depth of an object based on a single image. For example, a convolutional neural network can be trained to estimate the depth of a grinding particle using a training data set consisting of hundreds of images of milling burs and associated metrics such as height of each grinding particle and average height of the grinding particles. The height or depth of a grinding particle can be defined as the distance from the base to the tip of the grinding particle.

Analysis module 415 is configured to detect and measure most, if not all, of the grinding particles on the surface at the tip of the milling bur. Once the height of all the detected grinding particles are measured, the mean height value of can be determined, which also can be referred to as the mean tip value. Based at least on the percent grain coverage and/or the mean height value of the grinding particles, analysis module 415 can pass or fail each of the milling burs in the holding fixture.

Analysis module 415 can also send the pass/fail information of each milling bur to be stored in a database (not shown) via communication module 410. The pass/fail information can also be stored in memory local to system 400. The pass/fail information can include one or more identifying information such as batch number and milling bur ID or location ID within the holding mixture. For example, the holding fixture can be a 10×10 fixture that holds up to 100 milling burs. Each of the 10×10 slots can have a slot ID indicating the location of the slot within the 10×10 fixture. The slot ID can be from 1-100 or it can have a row-column ID format (e.g., A5, C7). In this way, analysis module 415 can keep track of whether each of the milling burs in the holding fixture has passed or failed QC.

In some embodiments, analysis module 415 can reject or pass a milling bur based on the factor of safety of the milling bur, which can be determined based at least on the percentage grain coverage of grinding particles at the tip of the milling bur. The factor of safety of a milling bur can also be based on the mean height value of the grinding particles. The factor of safety is a predicted number of dental prosthesis a milling bur can successfully mill before failure. For example, a factor of safety of 2 means the milling bur is predicted (with a high probability) that it can mill at least 2 complete dental prosthesis before failing on the third dental prosthesis. Similarly, a factor safety of 3 means the milling bur is predicted with a high probability that it can mill at least 3 full and complete dental prosthesis before failing on the fourth dental prosthesis.

As shown in Tables 1A and 1B, the factor of safety for a milling bur can be probabilistically determined based on the percentage grain coverage of the tip of the milling bur. For example, if a milling bur has a coverage-percentage of 25% or more, then it likely has a factor of safety of 2 because at 25% it is higher than the 23.4% average for milling burs with a factor of safety of 1. Similarly, if a milling bur has a coverage-percentage of 40-55%, then it likely has a factor of safety of 3.

Based on the factor of safety of a milling bur, analysis module 415 can identify a candidate dental prosthesis with machining/milling parameters that would best match with the determined factor of safety. For example, if a milling bur has a borderline factor of safety of 2 (very close to factor of safety of 1 spectrum), analysis module 415 can identify a candidate dental prosthesis that is small and would not take a lot of time to mill such has a crown for a lateral incisor tooth rather than crown for a molar. In another example, if a milling bur has a factor of safety of 3 or 4, analysis module 415 can identify a candidate dental prosthesis that is large with lots of dentition features such as a molar.

Part validation module 420 can use the pass/fail information to automatically identify and discard milling burs that have failed the QC process at 415 prior to shipping the batch or a portion of the batch to customers. Once analysis module 415 completes analyzing all of the milling burs in the holding fixture, the holding fixture can be moved to receiving area of part validation module 420.

In some embodiments, part validation module 420 can include a milling bur-removal apparatus configured to pick up and remove a milling bur from the holding fixture and discard it based on pass/fail information of each milling bur of the holding fixture. Using the slot ID of the failed milling bur, part validation module 120 can discard the milling bur at the location indicated by the slot ID. For example, if slot ID "A7" failed QC, part validation module 420 is configured to move the milling bur-removal apparatus to the milling bur at slot A7 and remove it. This process is repeated until all milling-burs with a failed status are discarded. In this way, only milling burs that have passed QC can be shipped to customers.

The milling bur-removal apparatus can be a mechanical and/or vacuum gripping apparatus. For example, milling bur-removal apparatus can be a mechanical clamping device configured to grab the tip of the milling bur and remove it from the holding fixture, which can be securely attached to validation module 420 such that the holding fixtures remain in place while the pick and discard process is performed. Alternatively, the holding fixture can include an ejection mechanism configured to eject any milling bur that has failed the QC process. For example, each slot of the holding fixture can include an actuatable pin that can inject the milling bur when actuated by part validation module 420. Alternatively, the ejection mechanism can be configured to move to a specific slot ID and eject the milling bur.

Figure 5:
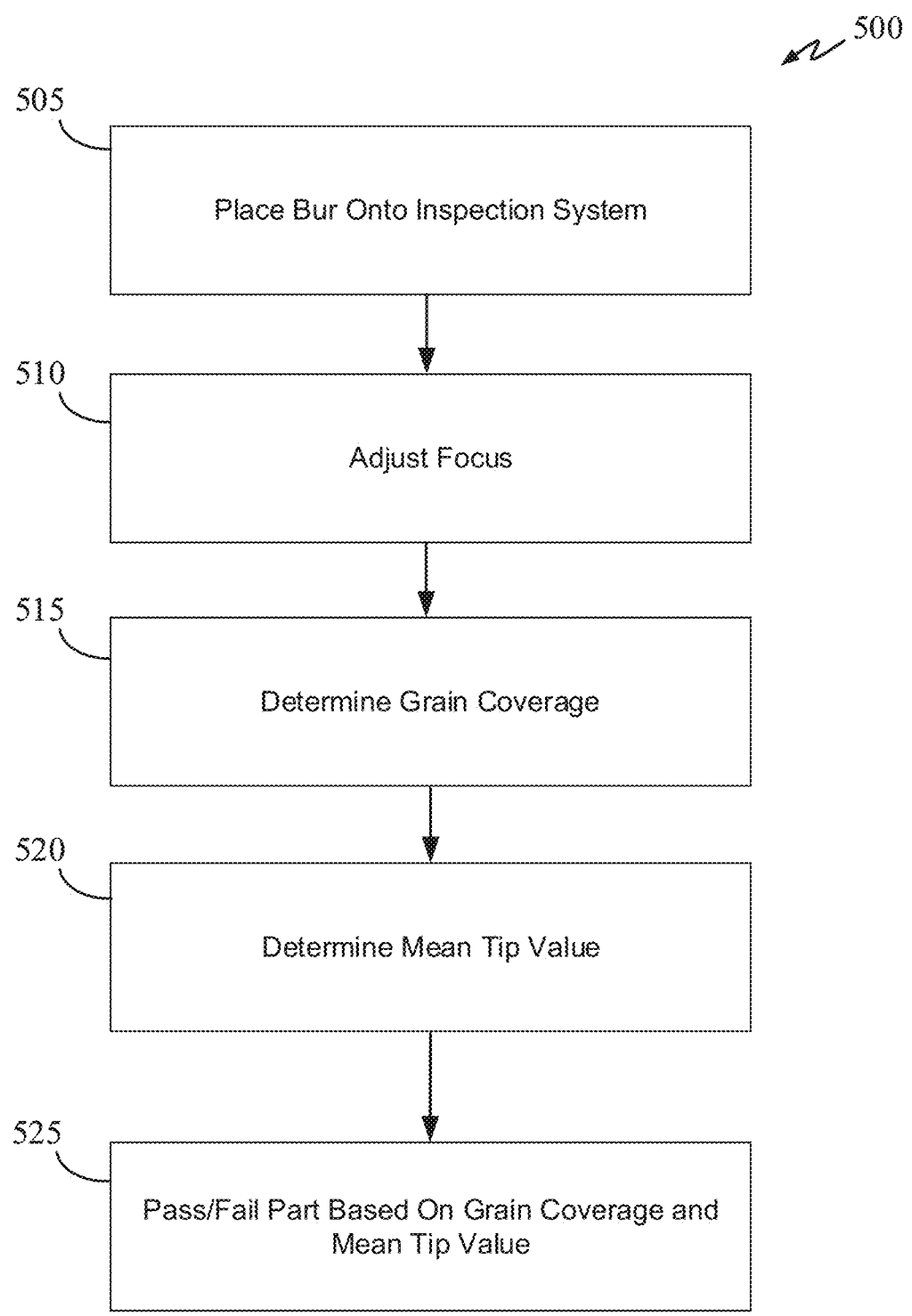
FIG. 5 is a flow diagram of an inspection process in accordance with some embodiments of the present disclosure.

FIG. 5 illustrates a QC process 500 used by QC system 400 to perform quality control on milling burs prior to shipping them to customers in accordance with some embodiments of the present disclosure. Process 500 starts at 505 where a milling bur is placed onto an inspection area of inspection system 405. In some embodiments, multiple milling burs can be visually inspected at the same time by the image analyzer (i.e., analysis module 415) of inspection system 405 Multiple milling burs can be placed on a holding fixture (e.g., burs inspection fixture) that is configured to hold multiple milling burs (e.g., 2, 10, 20, 100). The holding fixture can be secured to the inspection area using one or more placement guides (e.g., guideposts, slots) or visual aids. This enables the holding block to be correctly positioned with respect to the camera. Sub-process 505 can also include translating the holding fixture and/or the camera such that an alignment laser is properly aligned with the tip of a milling bur. This can be any milling bur such as the upper-left most, center, or upper-right most milling bur. The translation of holding fixture and/or the camera can be in the x and/or y direction. At 510, the focus of the camera is focused on the tip of a milling bur by adjusting the vertical position (e.g., the z direction) of the camera and/or the holding fixture.

At 515, using analysis module 415, the grain coverage is determined by calculating the total surface area of the grinding particles covering the total surface area of the tip of the milling bur. At 520, the height of each of the detected grinding particles is calculated and used to determine the mean height value of the grinding particles. At 525, using part validation module 420, each milling bur is discarded based at least on the percentage grain coverage and/or the mean height value.

Figure 6:
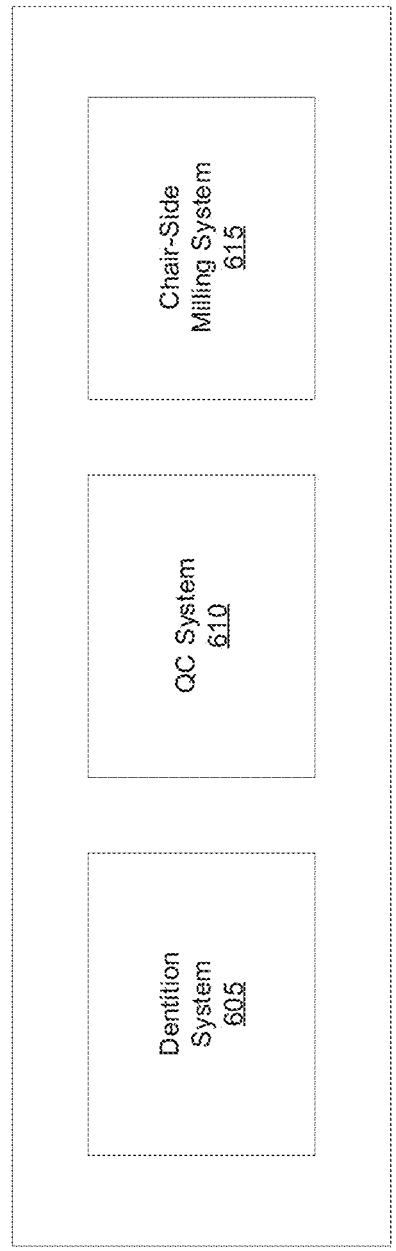
FIG. 6 is a block diagram of dental prosthesis fabrication system in accordance with some embodiments of the present disclosure.

FIG. 6 illustrates a chair-side dental prosthesis fabrication system 600 in accordance with some embodiments of the present invention. Fabrication system 600 includes dentition system 605, QC system 610, and chair-side milling system 615. Dentition system 605 can include a dentition database (not shown) that stores dentition models generated from intraoral scans of patients' dentition. The dentition database can be a local or a remote database accessible by various dental practitioners. Dentition models can include 3D prothesis models specifically designed for each patient based at least on intraoral scan of the patient's mouth or scan of impression models of the patient's dentition. In an example workflow, a dental practitioner would scan a patient mouth using an intraoral scanner and upload the scanned data to a lab where the patient's dental prosthesis can be designed and modeled based on the uploaded scanned data. The lab generated 3D model of the patient's dental prosthesis can then be retrieved by the dental practitioner using the same dentition system 605. Alternatively, the dental practitioner can send a 3D impression model (e.g., clay bite-impression) of the patient to the lab, which can then generate a 3D dentition model for the dental practitioner.

To fabricate a dental prosthesis at the dental practitioner's office, the dental practitioner can upload a patient's prosthesis model into chair-side milling system 615, which is configured to mill the dental prothesis using a fully-sintered zirconia blank based on the uploaded prothesis model. Next, the dental practitioner can select and install a milling bur on QC system 610, which can be a combination of inspection system 405 and analysis module 415. QC system 610 can be a separate unit or integrated into chair-side milling system 615. Once QC system 610 validates that the milling bur passes QC based on one or more criteria set forth in analysis module 415, dental practitioner can then install the validated milling bur into the milling machine of chair-side milling system 615 and start the milling process to fabricate the dental using a fully-sintered zirconia blank.

Figure 7:
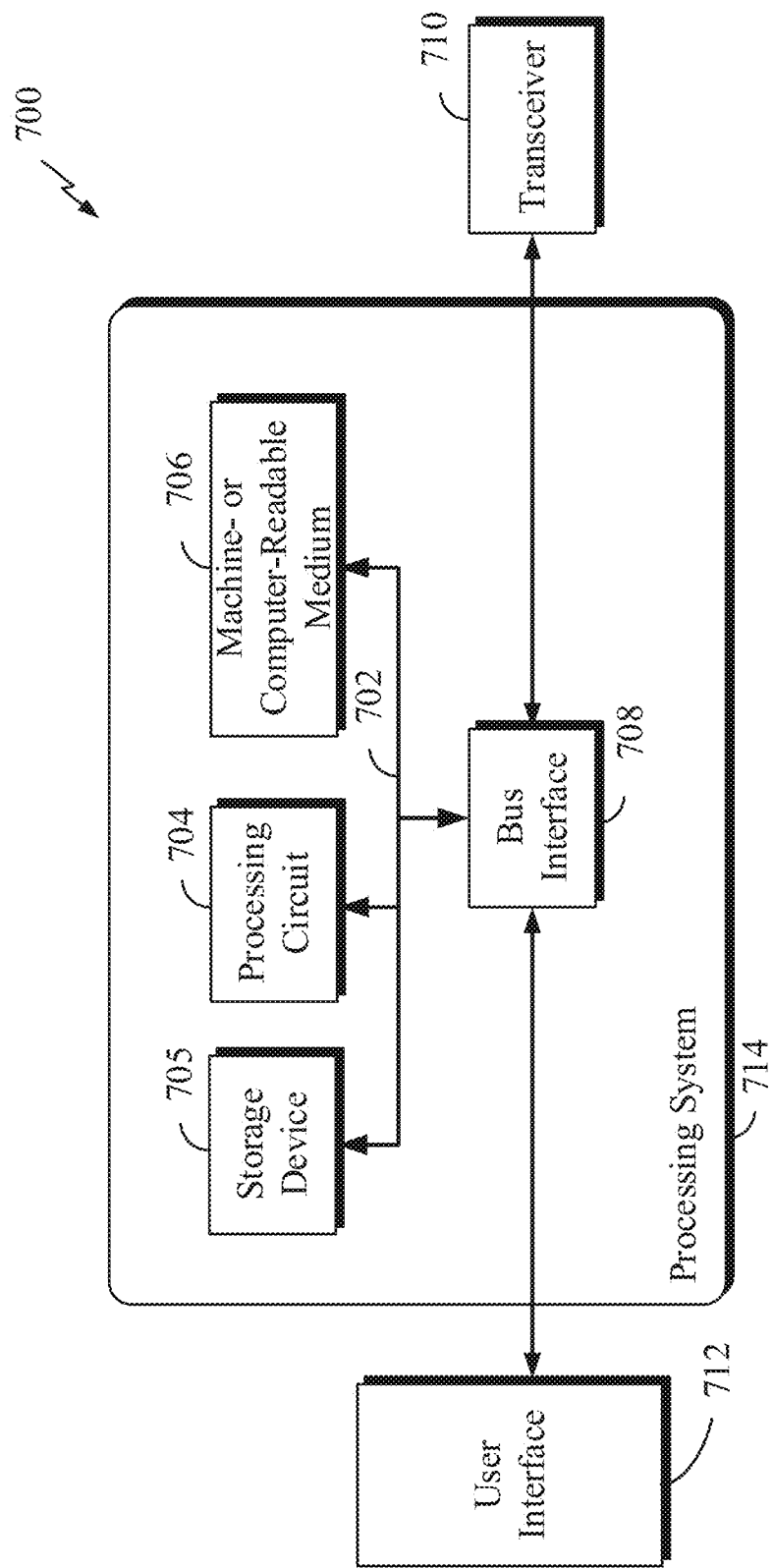
FIG. 7 is a block diagram illustrating an example of a hardware implementation of the dental prosthesis fabrication system shown in FIG. 6 in accordance with some embodiments of the disclosure.

FIG. 7 illustrates an overall system or apparatus 700 in which modules 405, 410, 415, 420, 605, and 610 and processes 100 and 150 can be implemented. In accordance with various aspects of the disclosure, an element, or any portion of an element, or any combination of elements may be implemented with a processing system 714 that includes one or more processing circuits 704. Processing circuits 704 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 704 may be used to implement any one or more of the processes described above and illustrated in FIGS. 1A, 1B, and 5.

In the example of FIG. 7, the processing system 714 may be implemented with a bus architecture, represented generally by the bus 702. The bus 702 may include any number of interconnecting buses and bridges depending on the specific application of the processing system 714 and the overall design constraints. The bus 702 links various circuits including one or more processing circuits (represented generally by the processing circuit 704), the storage device 705, and a machine-readable, processor-readable, processing circuit-readable or computer-readable media (represented generally by a non-transitory machine-readable medium 706.) The bus 702 may also link various other circuits such as timing sources, peripherals, voltage regulators, and power management circuits, which are well known in the art, and therefore, will not be described any further. The bus interface 708 provides an interface between bus 702 and a transceiver 710. The transceiver 710 provides a means for communicating with various other apparatus over a transmission medium. Depending upon the nature of the apparatus, a user interface 712 (e.g., keypad, display, speaker, microphone, touchscreen, motion sensor) may also be provided.

The processing circuit 704 is responsible for managing the bus 702 and for general processing, including the execution of software stored on the machine-readable medium 706. The software, when executed by processing circuit 704, causes processing system 714 to perform the various functions described herein for any particular apparatus. Machine-readable medium 706 may also be used for storing data that is manipulated by processing circuit 704 when executing software.

One or more processing circuits 704 (e.g., microprocessors) in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 706. The machine-readable medium 706 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 706 may reside in the processing system 714, external to the processing system 714, or distributed across multiple entities including the processing system 714. The machine-readable medium 706 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for manufacturing a dental prosthesis using a specialized-milling bur, the method comprising:
   determining, using an inspection system, one or more attributes of a tip of the specialized milling bur, wherein the one or more attributes comprise a mean height value of grinding particles covering a surface area of a tip of the milling bur;
   determining whether the one or more attributes meets a quality threshold based at least on the determined one or more attributes wherein the quality threshold comprises a factor of safety derived from empirical data obtained by a measuring and testing process for assessing test milling bur performance, wherein the factor of safety is a number of times the test milling bur can fully mill a test dental prosthesis from a fully-sintered zirconia blank; and
   rejecting or passing the milling bur for use in a milling machine to fabricate the dental prosthesis based at least on whether the one or more attributes meets the quality threshold.

2. The method of claim 1, wherein the measuring and testing process comprises a destructive measurement process that measures at least one of a coverage-percentage of the grinding particles covering the surface area of the tip and the mean height value of the grinding particles.

3. The method of claim 1, wherein the measuring and testing process comprises an image measurement process that measures at least one of a coverage-percentage of the grinding particles covering a surface area of the tip and the mean height value of the grinding particles.

4. The method of claim 1, wherein the factor of safety is at least 3, the factor of safety of at least 3 comprises a coverage-percentage of at least 40% of the surface area of the tip.

5. The method of claim 1, wherein rejecting or passing the milling bur further comprises:
identifying a candidate dental prosthesis having machining parameters that best fit the factor of safety of the milling bur; and
shipping the milling bur for use to mill the identified candidate dental prosthesis.

6. The method of claim 1, further comprising discarding milling burs that do not meet the quality threshold using a milling bur-removal apparatus.

7. The method of claim 1, wherein the inspection system is configured to measure a height of a diamond particle using focus variation.

8. The method of claim 1, wherein the factor of safety is at least 2, the factor of safety of at least 2 comprises a coverage-percentage of at least 25% of the surface area of the tip.

9. The method of claim 8, wherein the factor of safety of at least 2 further comprises a mean tip height of the grinding particles is less than 30 microns.

10. A method for determining whether a milling bur meets a probabilistic quality threshold, the method comprising:
using a focus variation imaging system to measure the heights of a plurality of grinding particles covering a surface area of a tip of the milling bur;
determining a mean height value of the plurality of grinding particles;
rejecting or passing the milling bur for use in a milling machine to fabricate a dental prosthesis based at least on whether the milling bur meets a probabilistic quality threshold mean height value.

11. The method of claim 10, wherein the probabilistic quality threshold mean height value of the grinding particles is less than 35 microns.

12. The method of claim 10, wherein the probabilistic quality threshold mean height value of the grinding particles is less than 30 microns.

13. The method of claim 10, wherein the probabilistic quality threshold mean height value of the grinding particles is between 20-25 microns.

14. The method of claim 10, wherein rejecting or passing the milling bur further comprises:
identifying a candidate dental prosthesis having machining parameters that best fit the measured mean height value of the grinding particles of the milling bur; and
shipping the milling bur for use to mill the identified candidate dental prosthesis.

15. The method of claim 10, further comprising discarding milling burs that do not meet the probabilistic quality threshold using a milling bur-removal apparatus.

16. The method of claim 10, further comprising:
using an image measurement process to measure a coverage-percentage of the grinding particles covering a surface area of the tip of the milling bur; and
rejecting or passing the milling bur for use in a milling machine to fabricate a dental prothesis based at least on whether the milling bur meets a probabilistic quality threshold coverage-percentage value.

17. The method of claim 16, wherein the probabilistic quality threshold coverage-percentage value of the grinding particles is at least 25% of the surface area of the tip of the milling bur.

18. The method of claim 16, wherein the probabilistic quality threshold coverage-percentage value of the grinding particles is between 25-55% of the surface area of the tip of the milling bur.

* * * * *